(12) United States Patent
Miyachi et al.

(10) Patent No.: US 9,212,465 B2
(45) Date of Patent: Dec. 15, 2015

(54) CONSTRUCTION MACHINE HAVING ELECTRICAL COMPONENT

(71) Applicant: KOBELCO CONSTRUCTION MACHINERY CO., LTD., Hiroshima-shi (JP)

(72) Inventors: Isao Miyachi, Hiroshima (JP); Hiroto Hayashi, Hiroshima (JP); Tomoyuki Tsuchihashi, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/604,167

(22) Filed: Jan. 23, 2015

(65) Prior Publication Data

US 2015/0211210 A1 Jul. 30, 2015

(30) Foreign Application Priority Data

Jan. 30, 2014 (JP) .................................. 2014-015795

(51) Int. Cl.
*E02F 9/08* (2006.01)
*B60K 11/06* (2006.01)
*B66C 13/52* (2006.01)
*E02F 9/00* (2006.01)
(Continued)

(52) U.S. Cl.
CPC ............... *E02F 9/0866* (2013.01); *B60K 11/06* (2013.01); *B66C 13/52* (2013.01); *E02F 9/00* (2013.01); *E02F 3/325* (2013.01); *E02F 9/2095* (2013.01)

(58) Field of Classification Search
CPC ......... E02F 9/0866; E02F 9/0858; E02F 9/10; E02F 9/121; F01P 7/02
See application file for complete search history.

(56) References Cited

U.S. PATENT DOCUMENTS 3,788,418 A * 1/1974 Clancy et al. ................. 180/68.4
5,816,351 A * 10/1998 Akira et al. ................... 180/68.1
(Continued)

FOREIGN PATENT DOCUMENTS

EP    1 775 392 A2    4/2007
EP    1 775 392 A3    4/2007
(Continued)

OTHER PUBLICATIONS

Extended European Search Report issued Jun. 3, 2015 in Patent Application No. 15152847.8.

*Primary Examiner* — Jeffrey J Restifo
*Assistant Examiner* — Erez Gurari
(74) *Attorney, Agent, or Firm* — Oblon, McClelland, Maier & Neustadt, L.L.P.

(57) ABSTRACT

Provided is a construction machine including an electrical component and efficiently cooling it. The construction machine includes an upper slewing body having an air intake chamber capable of taking in air, an engine, the electrical component, an air intake duct guiding the air inside the air intake chamber toward the engine, a blow fan directing the air inside the air intake chamber toward the engine through the air intake duct, and electrical-component cover covering the electrical component. The electrical-component cover defines an air flow path for flowing air along the electrical component, between the electrical-component cover and the electrical component thereinside. The electrical-component cover includes an air inlet communicating an upstream portion of the air flow path with the air intake chamber and an air outlet communicating a downstream portion of the air intake chamber with the air intake duct.

7 Claims, 8 Drawing Sheets (51) Int. Cl.
*E02F 3/32* (2006.01)
*E02F 9/20* (2006.01)

(56) References Cited

U.S. PATENT DOCUMENTS

| | | | | |
|---|---|---|---|---|
| 5,839,397 | A * | 11/1998 | Funabashi et al. | 123/41.01 |
| 5,884,589 | A * | 3/1999 | Sakamoto et al. | 123/41.49 |
| 6,192,839 | B1 * | 2/2001 | Takeshita et al. | 123/41.49 |
| 6,302,066 | B1 * | 10/2001 | Steinmann | 123/41.49 |
| 6,540,036 | B1 * | 4/2003 | Sugano | 180/68.1 |
| 2001/0007292 | A1 | 7/2001 | Yabf | |
| 2002/0033148 | A1 * | 3/2002 | Ito et al. | 123/41.65 |
| 2005/0188926 | A1 * | 9/2005 | Kimura et al. | 123/41.7 |
| 2006/0118281 | A1 * | 6/2006 | Radke et al. | 165/119 |
| 2006/0144350 | A1 * | 7/2006 | Nakashima et al. | 123/41.01 |
| 2007/0090650 | A1 | 4/2007 | Komiyama et al. | |
| 2008/0257623 | A1 * | 10/2008 | Yonetake et al. | 180/68.1 |
| 2009/0199553 | A1 * | 8/2009 | Nishimura et al. | 60/486 |
| 2010/0200193 | A1 * | 8/2010 | Yabe et al. | 165/47 |
| 2011/0154809 | A1 * | 6/2011 | Mitsuda et al. | 60/311 |
| 2013/0174526 | A1 * | 7/2013 | Watanabe et al. | 55/385.7 |
| 2013/0228388 | A1 * | 9/2013 | Ueda et al. | 180/68.1 |
| 2013/0299256 | A1 | 11/2013 | Yamashita | |
| 2013/0323001 | A1 * | 12/2013 | Ueki et al. | 414/722 |
| 2014/0034403 | A1 * | 2/2014 | Tokuda | 180/89.12 |
| 2014/0151143 | A1 * | 6/2014 | Nakashima et al. | 180/309 |
| 2014/0301816 | A1 * | 10/2014 | Kokuryo et al. | 414/687 |
| 2015/0016932 | A1 * | 1/2015 | Azuma et al. | 414/687 |
| 2015/0075893 | A1 * | 3/2015 | Sakai et al. | 180/309 |
| 2015/0086314 | A1 * | 3/2015 | Okuda et al. | 414/685 |
| 2015/0114748 | A1 * | 4/2015 | Hanada et al. | 180/309 |
| 2015/0125248 | A1 * | 5/2015 | Sasaki | 414/744.2 |
| 2015/0176245 | A1 * | 6/2015 | Murakami et al. | 180/68.1 |
| 2015/0211210 | A1 * | 7/2015 | Miyachi et al. | 180/68.1 |

FOREIGN PATENT DOCUMENTS

| | | |
|---|---|---|
| EP | 2 669 440 A1 | 12/2013 |
| GB | 2 358 165 A | 7/2001 |
| JP | 2001-234556 A | 8/2001 |
| JP | 2004-106619 A | 4/2004 |
| JP | 2005 146741 | 6/2005 |
| JP | 2011-219917 A | 11/2011 |

* cited by examiner

CONSTRUCTION MACHINE HAVING ELECTRICAL COMPONENT

BACKGROUND OF THE INVENTION

1. Field of the Invention

The present invention relates to a construction machine having an electrical component.

2. Description of the Background Art

Conventionally, there is known a construction machine including an electrical component such as a mechatronics controller, as disclosed in Japanese Unexamined Patent Publication No. 2005-146741. Disclosed therein is a hydraulic excavator including an electrical component such as a mechatronics controller. The hydraulic excavator includes an upper slewing body on which a cab is loaded. The cab has a box shape including a rear plate portion, on which the electrical component is mounted. Mounting the electrical component on the rear plate portion allows the operator to access the electrical component from the outside of the cab, and allows a work space for accessing the electrical component to be secured.

However, in a construction machine having a limited space for disposing parts, such as a hydraulic excavator with a rear portion having a small slewing radius, a mechatronics controller is disposed below a seat stand on which a operation seat is placed, in order to prevent each of electrical wirings to be connected to a monitor, a fuse box and the like disposed in an operation space of the upper slewing body from having an increased overall length. This arrangement involves a possibility of damage in electrical components including the mechatronics controller or the like. Specifically, the arrangement generally includes an engine disposed below the seat stand and the engine gives off heat which can generate heat wind and/or temperature increase of the seat stand, the heat wind or the temperature increase being capable of damaging the electric component.

SUMMARY OF THE INVENTION

An object of the invention is to provide a construction machine including an engine and an electrical component, the construction machine being capable of efficiently cooling the electrical component so as to prevent the electrical component from damage due to heat given off by the engine. Provided is a construction machine including: a lower traveling body; an upper slewing body slewably loaded on the lower traveling body, the upper slewing body including an air intake chamber capable of taking in air; an engine loaded on the upper slewing body; an electrical component loaded on the upper slewing body; an air intake duct forming a duct flow path for guiding the air taken into the air intake chamber toward the engine; a blow fan to direct the air inside the air intake chamber toward the engine through the duct flow path; and an electrical-component cover which covers the electrical component so as to define an air flow path, between the electrical-component cover and the electrical component disposed on an inner side of the electrical-component cover, for flowing air along the electrical component. The electrical-component cover includes an air inlet which brings an upstream portion of the air flow path into communication with the air intake chamber and an air outlet which brings a downstream portion of the air flow path into communication with the air intake duct.

These and other objects, features and advantages of the present invention will become more apparent upon reading the following detailed description along with the accompanying drawings.

DESCRIPTION OF THE PREFERRED EMBODIMENT

There will be described below an embodiment of the present invention based on the drawings. It should be noted that the following description of a preferred embodiment is merely an example in nature and is not intended to limit the present invention, its application, or its use. The directions such as up, down, front, rear, left, and right are indicated by respective arrows in each drawing. Unless otherwise particularly specified, up and down and other directions are described in accordance with the directions indicated by the arrows.

Figure 1:
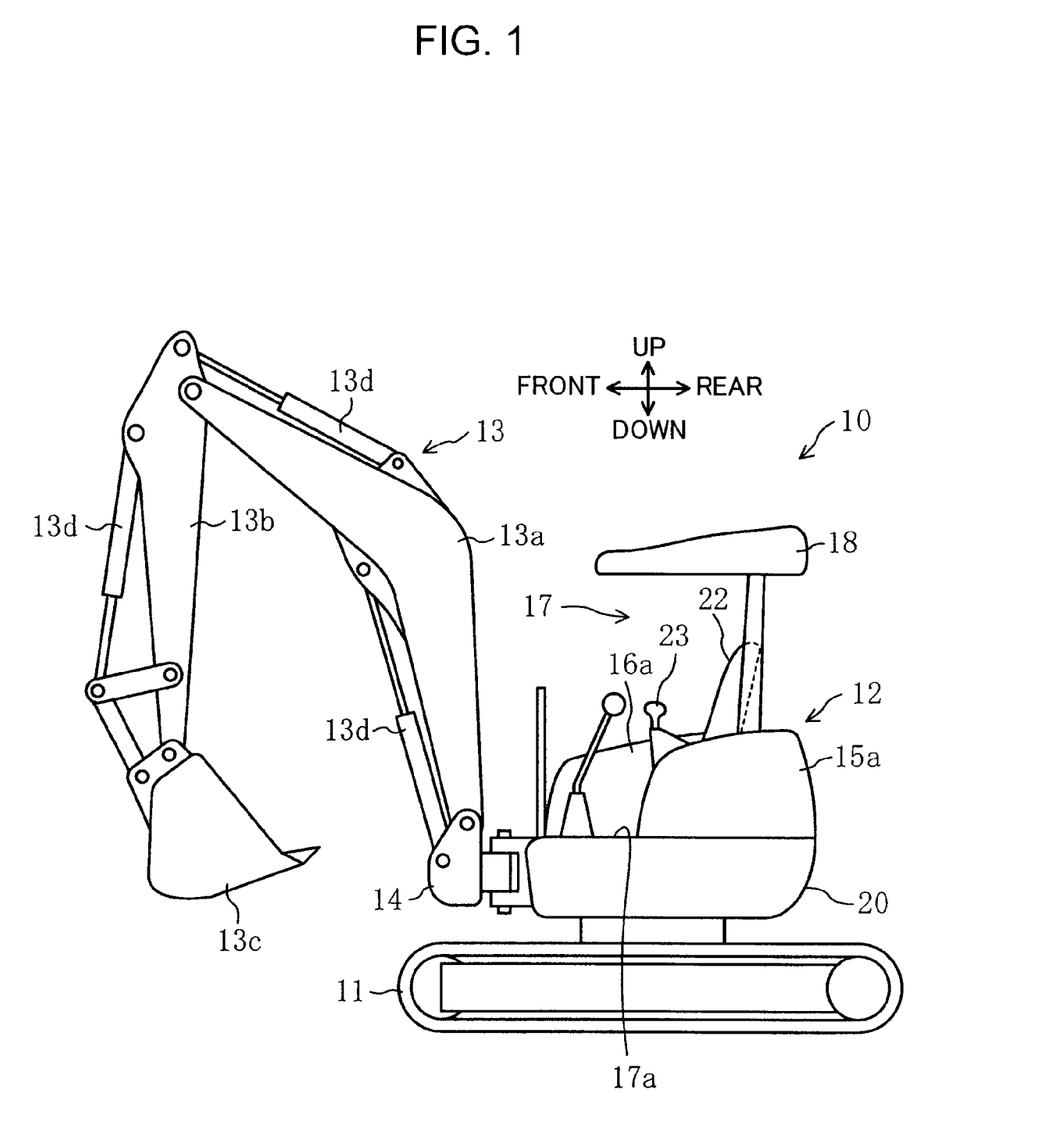
FIG. 1 is a side view showing a configuration of a construction machine according to an embodiment of the invention.

FIG. 1 is a side view showing a construction machine 10 according to an embodiment of the invention. The construction machine 10 is a hydraulic excavator with a rear portion having a small slewing radius. The construction machine 10 includes a crawler-type lower traveling body 11, an upper slewing body 12 slewably loaded on the lower traveling body 11, an attachment 13, an engine 28 (see FIG. 3) to be loaded on the upper slewing body 12, and a mechatronics controller 40 as an electrical component to be loaded on the upper slewing body 12.

The upper slewing body 12 is provided with an engine room 15 in the rear portion of the upper slewing body 12, the engine room 15 accommodating devices including the engine 28 in the engine room 15. The upper slewing body 12 is provided with a side machine-chamber 16 in the right portion of the upper slewing body 12, the side machine-chamber 16 accommodating a fuel tank, a hydraulic oil tank, and the like (all of which are not shown). The engine room 15 is covered with an engine cover 15a. The side-machine chamber 16 is covered with a machine chamber cover 16a.

The left portion of the upper slewing body 12 defines an operation space 17, in which an operation seat 22 and an operation lever 23 are disposed. On the upper side of the upper slewing body 12, disposed is a hood 18 for covering the operation space 17.

The attachment 13 is supported on the front side of the upper slewing body 12 so as to be capable of being raised and lowered and so as to be swung in right and left directions. The attachment 13, which is used for excavation and the like, includes a boom 13a with a basal end and a distal end, an arm 13b having a basal end and a distal end, a bucket 13c, and a plurality of hydraulic cylinders 13d. The basal end of the boom 13a is swingably connected to the upper slewing body 12 via a swing bracket 14. The basal end of the arm 13b is pivotally connected to the distal end of the boom 13a. The bucket 13c is pivotally connected to the distal end of the arm 13b. The hydraulic cylinders 13d are provided for the boom 13a, the arm 13b, and the bucket 13c, respectively. The hydraulic cylinders 13d are extended and retracted in accordance with an operation applied to the operation lever 23 to actuate the attachment 13. Besides, to the swing bracket 14 is connected an unshown swing cylinder, which is extended and retracted to swing the swing bracket 14 and the attachment 13 supported on the swing bracket 14, in right and left directions.

Figure 2:
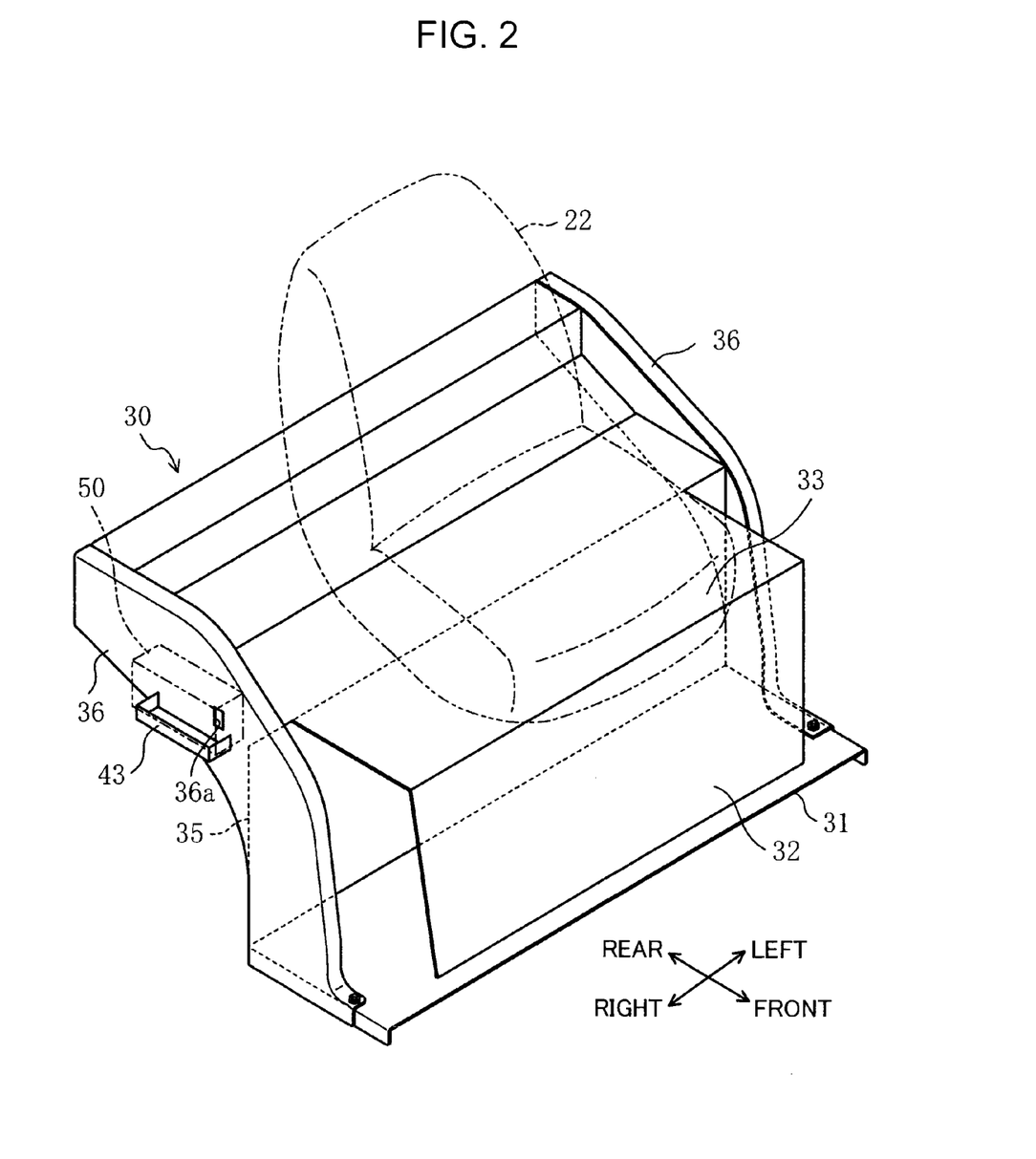
FIG. 2 is a perspective view of a seat stand in the construction machine.
Figure 3:
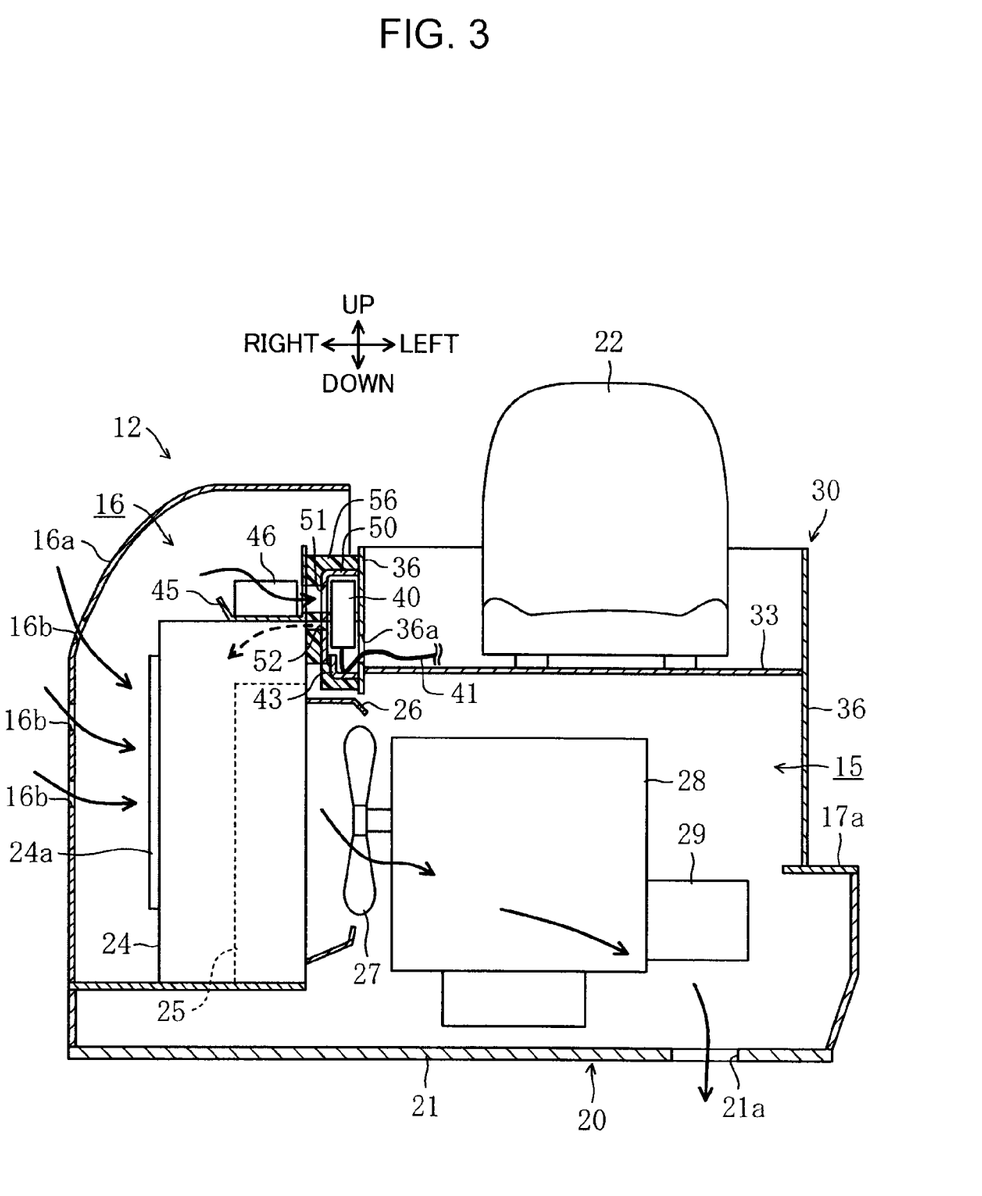
FIG. 3 is a sectional front view showing a structure of a portion of the construction machine, the portion including a disposed mechatronics controller.

The upper slewing body 12 includes an upper frame 20 shown in FIG. 3, and a seat stand 30 shown in FIG. 2. The upper frame 20 has a bottom plate 21, on which the seat stand 30 is disposed. The seat stand 30 includes a bottom plate portion 31, a front plate portion 32, a top plate portion 33, a rear plate portion 35, and right and left or side wall portions 36 and 36, these portions assembled into a unit.

The bottom plate portion 31 is formed of a substantially rectangular plate member laterally long. The bottom plate portion 31 is located rearward of a floor surface 17a of the operation space 17 shown in FIG. 1.

The front plate portion 32 is formed of a substantially rectangular plate member being laterally long but having a smaller lateral length than that of the bottom plate portion 31. The front plate portion 32 is in a substantially upright posture extending along the front edge of the bottom plate portion 31, having a lower edge portion joined to the upper surface of the bottom plate portion 31. The front plate portion 32 is raised from the bottom plate portion 31 so as to include a front surface facing the operation space 17.

The top plate portion 33 is formed of a plate member continuous with an upper end edge of the front plate portion 32, extending rearward from the upper end edge of the front plate portion 32. The front plate portion 32 and the top plate portion 33 can be formed by bending a single plate member. The top plate portion 33 is disposed just above the bottom plate portion 31 substantially in parallel to the bottom plate portion 31 so as to have an upper surface and a lower surface. The operation seat 22 is placed on the upper surface of the top plate portion 33 at an appropriate position, for instance, at an intermediate position in right and left directions, namely, in a width direction, of the construction machine 10.

The rear plate portion 35 is disposed rearward of the front plate portion 32 substantially in parallel thereto. The rear plate portion 35 is continuous with the rear end of the bottom plate portion 31 and stands upright.

The right and left wall portions 36, 36 have respective arc shapes in side view, constituting right and left portions of the seat stand 30, respectively. To the left wall portion 36 are joined respective left ends of the bottom plate portion 31, the top plate portion 33, and the rear plate portion 35; to the right wall portion 36 are joined respective right ends of the bottom plate portion 31, the top plate portion 33, and the rear plate portion 35.

As shown in FIG. 3, the engine 28 is disposed on the bottom plate 21 and located under the top plate portion 33 and between the paired right and left wall portions 36 and 36. The bottom plate 21 is formed with an air exhaust port 21a providing communication between the inside and the outside of the engine room 15.

The machine chamber cover 16a has a right wall portion, which portion is formed with a plurality of air intake ports 16b. The side-machine chamber 16 constitutes an intake chamber capable of taking in external air through the air intake ports 16b into the side-machine chamber 16.

The construction machine 10 further includes an air intake duct 24, a heat exchanger 25 such as a radiator for engine cooling or an oil cooler, a fan shroud 26, a blow fan 27, the engine 28, and a hydraulic pump 29. These are arranged in the side-machine chamber 16 and in the engine room 15 in the order of the air intake duct 24, the heat exchanger 25, the fan shroud 26, the blow fan 27, the engine 28, and the hydraulic pump 29 from upstream side in the air flow direction.

The air intake duct 24 surrounds a duct flow path for guiding the air taken into the side-machine chamber 16 toward the engine 28. The air intake duct 24 has an upstream end, on which an air filter 24a is mounted. The heat exchanger 25 is disposed downstream of the air intake duct 24.

The fan shroud 26 is located between the engine 28 and the downstream portion of the heat exchanger 25, having a cylindrical shape to cover the blow fan 27 on a radially outer side of the blow fan 27. The fan shroud 26 includes a portion partitioning the space between the heat exchanger 25 and the seat stand 30 into upper and lower parts.

The blow fan 27 forms a flow of air directed toward the engine 28 through the duct flow path in the air intake duct 24. Specifically, the blow fan 27 is rotationally driven to perform: taking the external air into the side-machine chamber 16 through the air intake ports 16b; flowing the taken air through the internal flow path of the air intake duct 24 while causing the air filter 24a to collect dust therein; making the air pass through the heat exchanger 25 to bring the air into heat exchange therein; and directing the air toward the engine 28 through the inside of the fan shroud 26. The air is thus put to use for cooling the engine 28 and the hydraulic pump 29. The air having cooled the engine 28 and the hydraulic pump 29 is released, as shown by the arrows in FIG. 3, downward through the air exhaust port 21a formed in the bottom plate 21 of the upper frame 20.

In the operation space 17 are provided a monitor, a fuse box, and the like, which are not shown and which are controlled by the mechatronics controller 40. The mechatronics controller 40 is connected to the monitor and the like through an electric wiring 41.

It is preferable that the mechatronics controller 40 is disposed near the seat stand 30 so as to prevent the electric wiring 41 from having an increased overall length and disposed so as to restrain the mechatronics controller 40 from receiving influence of heat from the engine 28. The mechatronics controller 40 in the embodiment is detachably attached to an outer surface of the right wall portion 36 at a position higher than the fan shroud 26 and near the upper portion of the heat exchanger 25.

The construction machine 10 further includes an electrical-component cover for covering the mechatronics controller 40. The electrical-component cover in the embodiment is constituted of the right wall portion 36 of the seat stand 30, a tray 43, and a controller cover 50.

Figure 6:
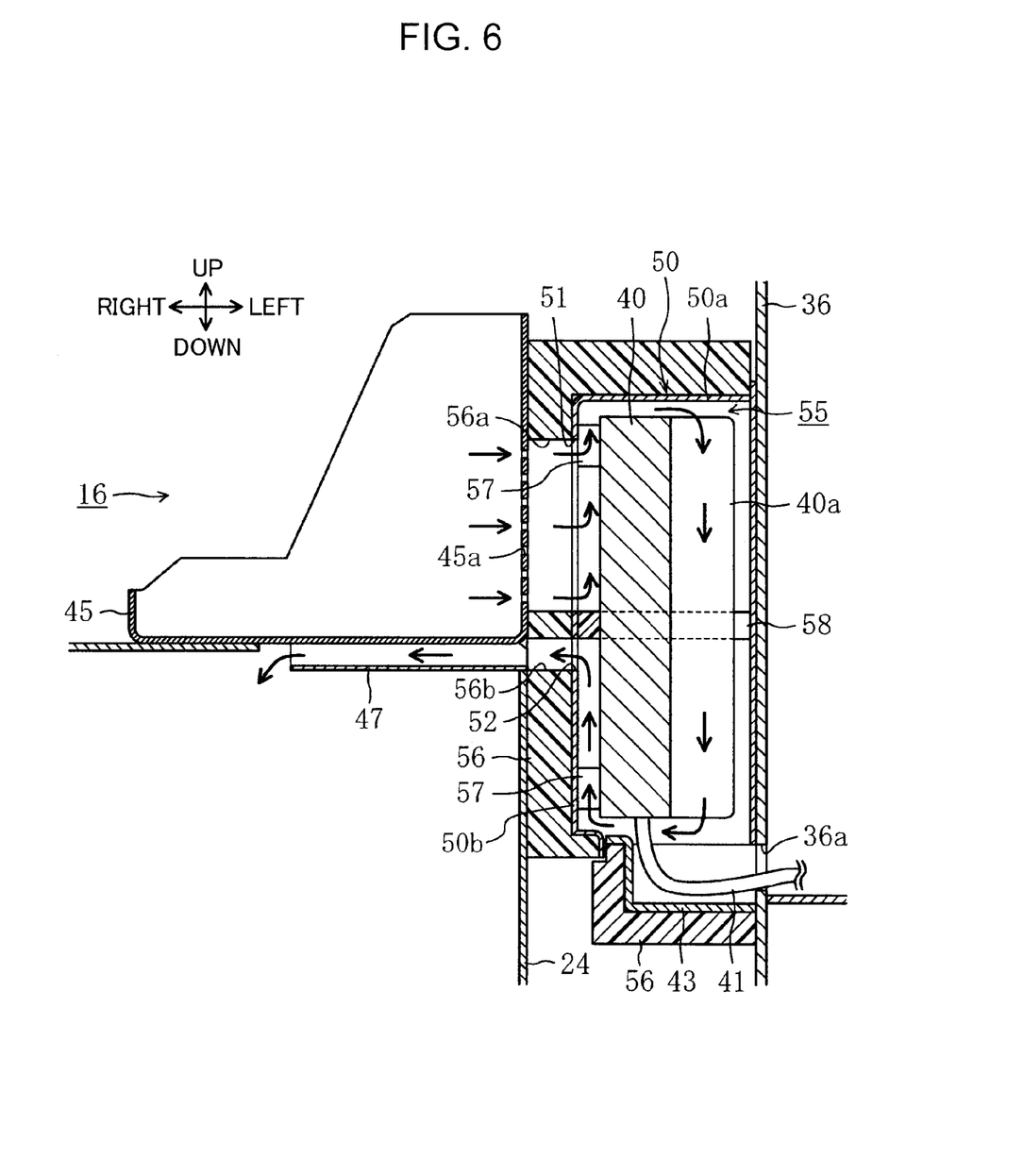
FIG. 6 is a sectional front view showing a stream of air in the portion shown in FIG. 4.

The controller cover 50 has a box shape, including an upper wall portion 50a shown in FIG. 6, front and rear wall portions not graphically shown, and a right wall portion 50b shown in FIG. 6, thus being opened leftward and downward. The mechatronics controller 40 is detachably attached to the right wall portion 36 of the seat stand 30 by respective bolts 53 (see FIG. 4) and fastening nuts (not shown) for fastening the controller cover 50 and the right wall portion 36. The right wall portion 36 covers the left surface of the thus attached mechatronics controller 40.

The tray 43 is disposed so as to close the lower opening of the controller cover 50. Specifically, the tray 43 is disposed on the lower side of the mechatronics controller 40 so as to cover the lower surface of the mechatronics controller 40. The controller cover 50, the right wall portion 36 and the tray 43, thus surrounding and covering the mechatronics controller 40, protect the mechatronics controller 40 from raindrops and dust.

The right wall portion 36 is formed with a wiring hole 36a, which allows the electrical wiring 41 interconnecting the mechatronics controller 40 and the not-graphically-shown monitor as described above to be wired while passing through the wiring hole 36a. The wiring hole 36a has a vertically extending shape.

Figure 8:
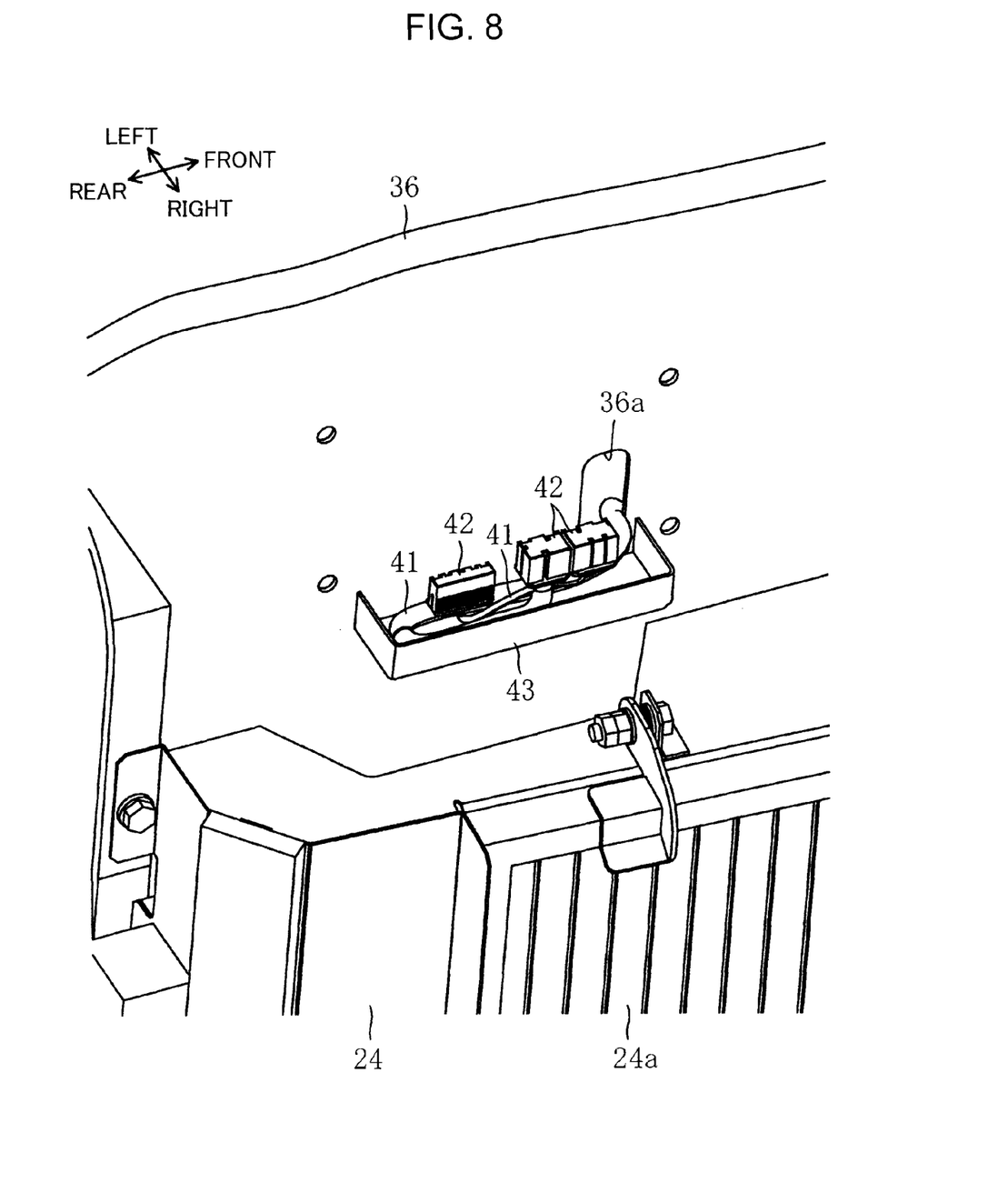
FIG. 8 is a perspective view showing a tray accommodating an electrical wiring connected to the mechatronics controller.

The tray 43 has an upward opened box shape and is mounted on the outer surface of the right wall portion 36 at a position under the wiring hole 36a. The tray 43 extends in front and rear directions of the upper slewing body 12 to accommodate a part of the electrical wiring 41, the part being drawn out from the right wall portion 36, and a connector 42 shown in FIG. 8. The tray 43 has a surface on the opposite side to the electrical wiring 41 and the connector 42, namely, an outer surface, to which a seal member 56 with a heat insulation property is attached.

The construction machine 10 further includes a placement member 45 having a placement wall portion horizontal to allow a tool box 46 to be placed thereon and a side wall portion extending upward from an inner side end, i.e., a left end, of the main wall portion. The placement member 45 is located on the outer side of the controller cover 50 in right and left directions of the upper slewing body 12, i.e., on the right side thereof. The placement member 45 is disposed at a position just above the air intake duct 24, the position making the placement member 45 overlap the mechatronics controller 40 in side view. This enables the placement member 45 to first receive an external impact due to roll-over of the construction machine 10 and the like to thereby prevent the impact from direct application to the mechatronics controller 40.

The construction machine 10 according to the embodiment includes a cooling structure for actively cooling the mechatronics controller 40 by effective utilization of the air taken in for cooling the engine 28 as described above. The cooling structure includes the right wall portion 36 constituting the electrical-component cover, the controller cover 50, the tray 43, and further a plurality of cooling fins 40a shown in FIG. 6 and FIG. 7. The cooling fins 40a are provided to the left wall portion of the mechatronics controller 40, the left portion facing the side opposite to the right wall portion 50b of the controller cover 50, the right wall portion facing the side-machine chamber 16 and the air intake duct 24. The cooling fins 40a project outward beyond the outer surface of the left wall portion of the mechatronics controller 40. The cooling fins 40a are spaced widthwise of the mechatronics controller 40, i.e., in the front and rear directions of the upper slewing body 12, each being a vertically extending plate member.

The controller cover 50 is formed with an air inlet 51 and an air outlet 52. The air inlet 51 and the air outlet 52 are formed in the right wall portion 50b of the controller cover 50, the right wall portion 50b facing the inner space of the side-machine chamber 16 and the inner space of the air intake duct 24 while spreading across them. The air inlet 51 and the air outlet 52 are opened toward upstream and downstream portions of an air flow path 55, respectively, the air flow path 55 being formed inside the controller cover 50 as will be described later. The air inlet 51 is located above the air outlet 52 and brings the upstream portion of the air flow path 55 into communication with the inner space of the side-machine chamber 16. The air outlet 52 brings the downstream portion of the air flow path 55 into communication with the inner space of the air intake duct 24.

The seal member 56, which has elasticity and heat insulation property is attached to the outer surface of the controller cover 50. The seal member 56 has seal holes 56a and 56b shown in FIG. 6, which are formed at respective positions associated with the air inlet 51 and the air outlet 52. The seal member 56 is capable of being sandwiched between the respective left wall portions of the placement table 40 and of the air intake duct 24 and the right wall portion 50b of the controller cover 50 while involving elastic compressive deformation of the seal member 56 to thereby close the clearance between the controller cover 50 and the pair of the placement member 45 and the air intake duct 24 in a region along respective peripheries of the air inlet 51 and the air outlet 52.

Figure 4:
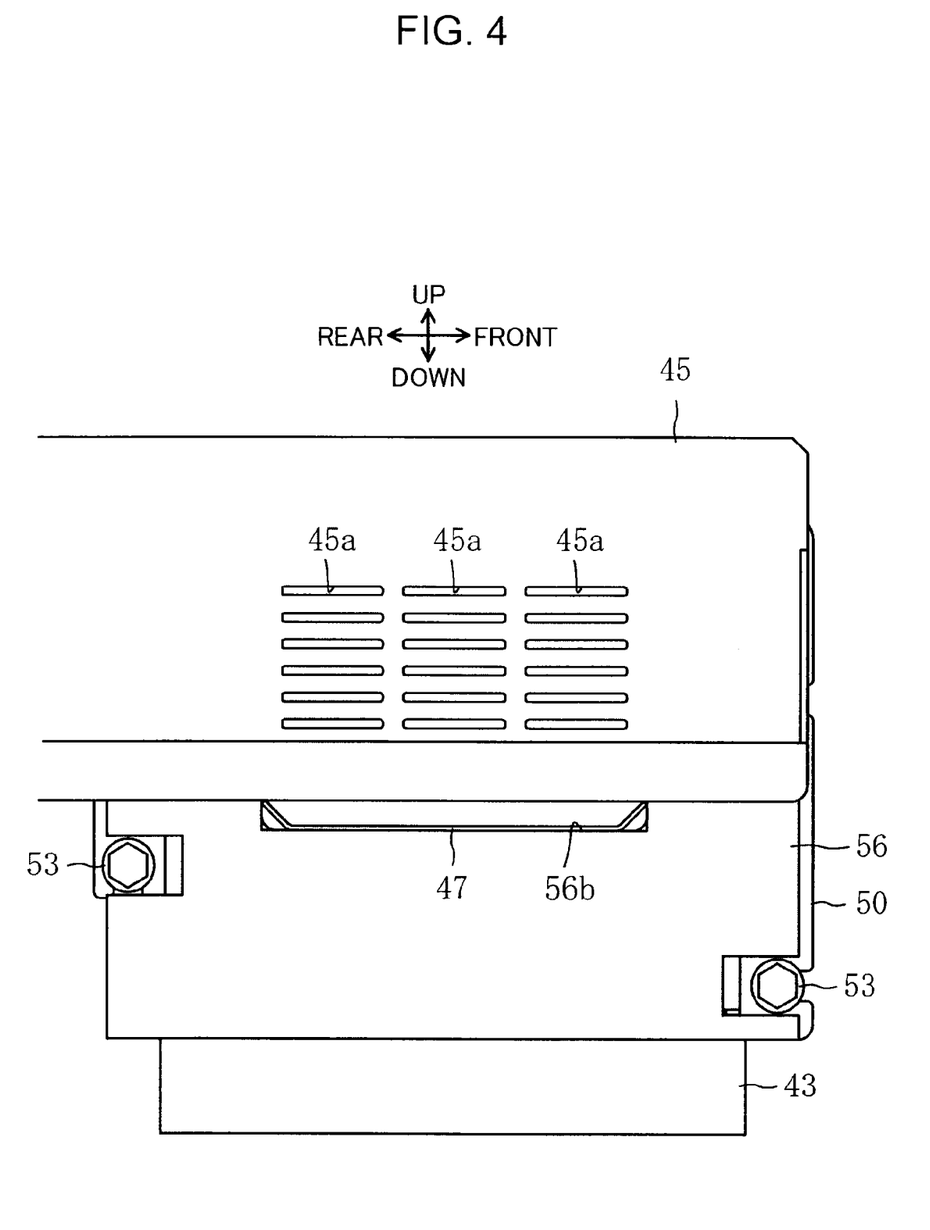
FIG. 4 is a side view of a portion of the construction machine, the portion accommodating the mechatronics controller.
Figure 5:
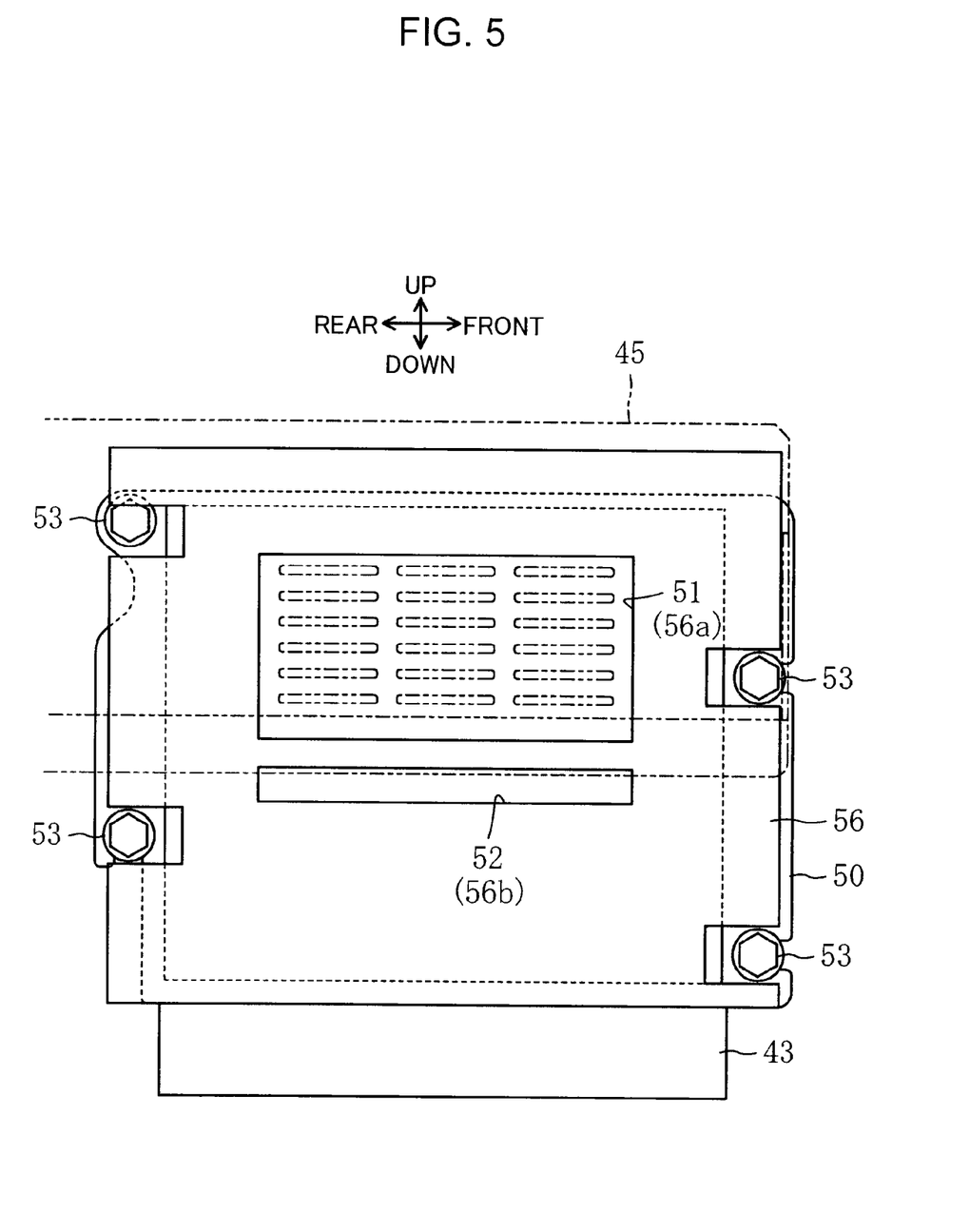
FIG. 5 is a side view showing a state where an electrical-component cover is removed from the portion shown in FIG. 4.

As shown in FIG. 4 and FIG. 5, the wall portion of the placement member 45, namely, a left wall portion, includes a plurality of slit-shaped communication holes. The communication holes 45a are formed in such a region that they can have communication with the air inlet 51 of the controller cover 50, thus allowing the air inlet 51 to make communication with the side-machine chamber 16 through the communication holes 45a.

The placement wall portion of the placement member 45 has a lower surface, along which a guide plate 47 shown in FIG. 6 is provided in the air intake duct 24. The guide plate 47 forms a guide flow path between the guide plate 47 and the lower surface of the placement member 45 so as to guide the air discharged through the air outlet 52 into the air intake duct 24. The air outlet 52 of the controller cover 50 is, therefore, in communication with the interior of the air intake duct 24 through the guide flow path formed between the lower surface of the placement member 45 and the guide plate 47.

This structure further includes a plurality of spacers 57 and a partition member 58 which are inside the controller cover 50.

The spacers 57 are interposed between the right wall portion 50b of the controller cover 50, the right wall portion 50b formed with the air inlet 51 and the air outlet 52 as described above, and the right surface of the mechatronics controller 40, thereby forming a clearance between the inner surface of the right wall portion 50b and the right surface of the mechatronics controller 40. The mechatronics controller 40 in the embodiment is fixed to a position which allows respective clearances to be made between the upper surface of the mechatronics controller 40 and the upper wall portion of the controller cover 50, between the lower surface of the mechatronics controller 40 and the tray 43, and between each of the cooling fins 40a and the right wall portion 36.

The partition member 58 partitions the clearance formed by the spacers 57, that is, the clearance between the inner surface of the right wall portion 50b of the controller cover 50 and the right surface of the mechatronics controller 40, into a space in communication with the air inlet 51 and a space in communication with the air outlet 52. The partition member 58 continuously extends across the front wall portion, the right wall portion, and the rear wall portion of the controller cover 50. The mechatronics controller 40 is disposed so as to bring the right surface thereof into contact with the partition member 58 to thereby place the partition member 58 between the right surface of the mechatronics controller 40 and the right wall portion 50b, thereby forming the air flow path 55 as shown in FIG. 6. The air flow path 55 has a shape capable of guiding the air taken into the inside of the controller cover 50 through the air inlet 51 to the air outlet 52 while flowing the air along the surface of the mechatronics controller 40. Specifically, the air flow path 55 in the embodiment is constituted of a plurality of clearances surrounding the mechatronics controller 40, the clearances including: a clearance between the inner surface of the right wall portion of the controller cover 50 and the right surface of the mechatronics controller 40; a clearance between the inner surface of the upper surface portion of the controller cover 50 and the upper surface of the mechatronics controller 40; a clearance between the cooling fins 40a adjacent to each other; a clearance between the upper surface of the tray 43 and the lower surface of the mechatronics controller 40; and a clearance between the inner surface of the right wall portion of the controller cover 50 and the right surface of the mechatronics controller 40.

This cooling structure enables the rotational driving of the blow fan 27 for cooling the engine 28 to form also air flow which is effective for cooling the mechatronics controller 40. Specifically, the driving of the blow fan 27 causes the external air of the construction machine 10 to be taken into the side-machine chamber 16 through the air intake ports 16b, to pass through the duct flow path inside the air intake duct 24, to make heat exchange with coolant in the heat exchanger 25, and to be blown, thereafter, toward the engine 28. In addition, the pressure inside the air intake duct 24 is made lower than the pressure inside the side-machine chamber 16, thus causing a part of the air taken in through the air intake ports 16b to be sucked into the inside of the controller cover 50 through the communication holes 45a of the placement member 45 and through the air inlet 51 of the controller cover 50. Thus sucked air is flowed through the air flow path 55 formed around the mechatronics controller 40 to thereby cool the mechatronics controller 40 efficiently and thereafter discharged to the inside of the air intake duct 24 through the air outlet 52. In association with the air flow, the cooling fins 40a of the mechatronics controller 40 further enhance the cooling efficiency by increasing contact area of the mechatronics controller 40 with the flowed air. Thus cooling the mechatronics controller 40 can effectively restrain the mechatronics controller 40 from damage due to influence of heat from the engine 28.

Furthermore, the construction machine 10 allows maintenance of the mechatronics controller 40 to be made, for instance, by following the steps below.

Figure 7:
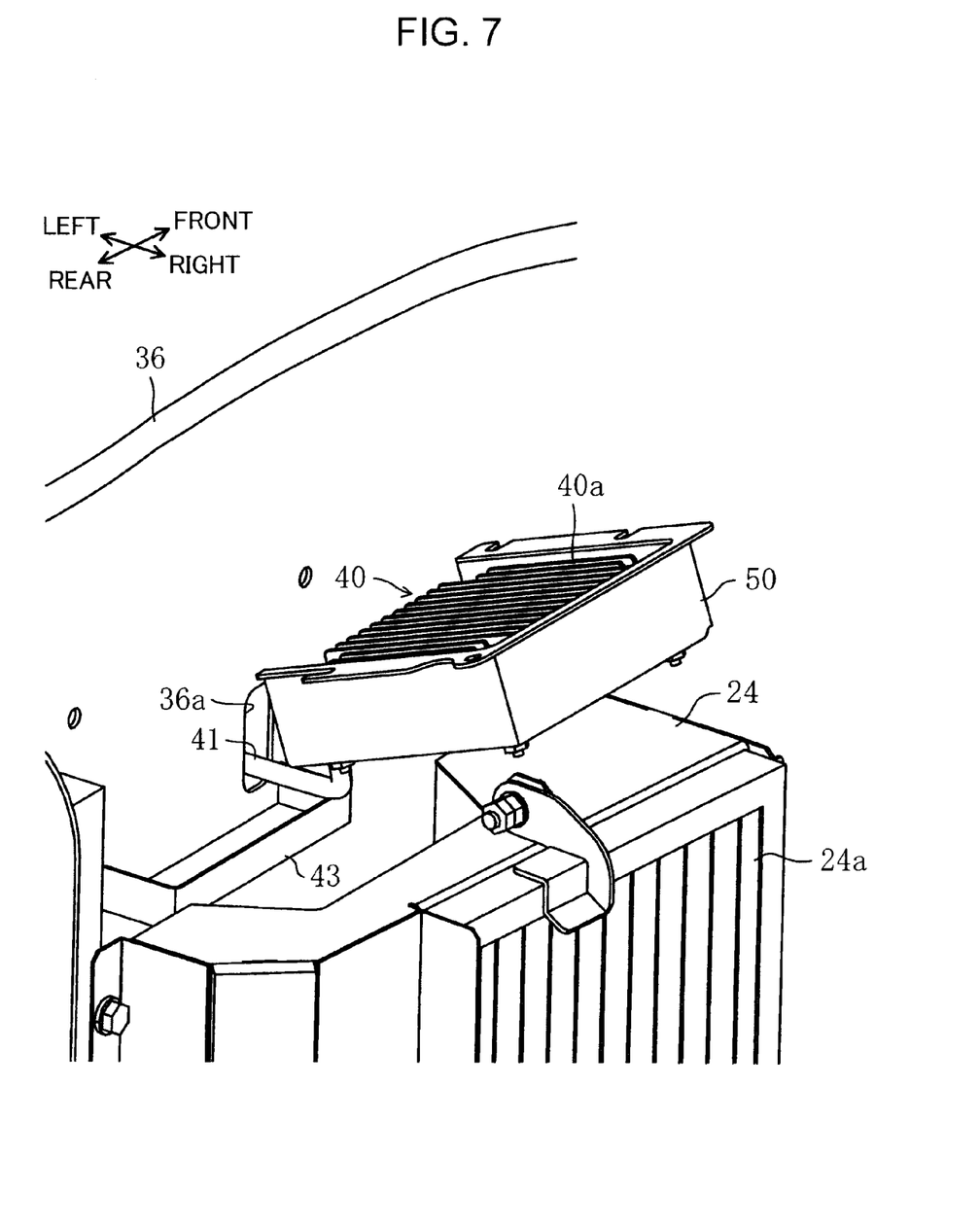
FIG. 7 is a perspective view showing a process of dismounting the mechatronics controller from the seat stand.

First of all, the placement member 45 is removed to expose the controller cover 50. The controller cover 50, which is mounted on the wall portions 36 of the seat stand 30 by use of the fastening bolts 53, can be removed from the wall portions 36 as shown in FIG. 7 by loosening the fastening bolts 53.

The controller cover 50 and the mechatronics controller 40 can be pulled out to the front side of the operator based on the above procedure, which allows the electrical wiring 41 and the connector 42 to be drawn out through the wiring hole 36a of the right wall portion 36. Thereafter, the mechatronics controller 40 is disconnected from the connector 42 connected to the electrical wiring 41, which allows the mechatronics controller 40 to be removed (see FIG. 8). The electrical wiring 41 and the connector 42 thus drawn out of the right wall portion 36 can be accommodated in the tray 43.

The mechatronics controller 40 can be mounted on the seat stand 30 by the steps reverse to the aforementioned steps. During the mounting, the electrical wiring 41 and the connector 42, which are accommodated in the tray 43, allows an operator to easily connect the mechatronics controller 40 to the electrical wiring 41. Besides, the above accommodation prevents the electrical wiring 41 from being sandwiched between the mechatronics controller 40 and the right wall portion 36.

The invention is not limited to the aforementioned embodiment.

While the right wall portion 36 of the seat stand 30, in the above embodiment, serves as also a part of the electrical-component cover, the electrical-component cover may be constituted of a dedicated member.

While both of the air inlet 51 and the air outlet 52, in the above embodiment, are formed in the right wall portion 50b commonly, the air inlet 51 and the air outlet 52 may be separately provided. For instance, the air inlet 51 may be formed in the upper wall portion 50a of the controller cover 50.

While the engine 28 in the embodiment is disposed within a space between the pair of side wall portions 36 of the seat stand 30, the engine 28 may be partially protruded outward beyond the side wall portion 36.

As described above, provided is a construction machine including an engine and an electrical component, the construction machine being capable of efficiently cooling the electrical component so as to prevent the electrical component from damage due to heat given off by the engine. Provided is a construction machine including: a lower traveling body; an upper slewing body slewably loaded on the lower traveling body, the upper slewing body including an air intake chamber capable of taking in air; an engine loaded on the upper slewing body; an electrical component loaded on the upper slewing body; an air intake duct forming a duct flow path for guiding the air taken into the air intake chamber toward the engine; a blow fan to direct the air inside the air intake chamber toward the engine through the duct flow path; and an electrical-component cover which covers the electrical component so as to define an air flow path, between the electrical-component cover and the electrical component disposed on an inner side of the electrical-component cover, for flowing air along the electrical component. The electrical-component cover includes an air inlet which brings an upstream portion of the air flow path into communication with the air intake chamber and an air outlet which brings a downstream portion of the air flow path into communication with the air intake duct.

According to the provided construction machine, the air flowing through the air flow path defined between the electrical-component cover and the electrical component on the inner side of the electrical-component cover can efficiently cool the electrical component, thereby preventing the electrical component from damage due to an influence of heat given off from the engine. Specifically, since the air inlet and the air outlet formed in the electrical-component cover have respective communications with the air intake chamber and with the air intake duct while the blow fan discharges air flowing inside the air intake duct toward the engine to thereby make the pressure inside the air intake duct be lower than the pressure inside the air intake chamber, the air taken into the air intake chamber is sucked inside the electrical-component cover through the air inlet and discharged to the inside of the air intake duct through the air outlet after passing through the air flow path which is a limited space between the electrical-component cover and the electrical component. The air thus flowing along the outer surfaces of the electrical component can effectively cool the electrical component.

Preferably, the electrical component is surrounded by a clearance which is formed between an outer surface of the electrical component and an inner surface of the electrical-component cover, the clearance constituting the air flow path.

For instance, in the case where the electrical-component cover includes a side wall portion facing both of a first space in the air intake chamber and a second space in the air intake duct across the first and second spaces and the air inlet and the air outlet are formed in the side wall portion, it is preferable that the construction machine further includes a partition member provided inside the electrical-component cover to partition a clearance between an inner surface of the side wall portion and the outer surface of the electrical component into a space in communication with the air inlet and a space in communication with the air outlet. The partition member makes it possible to form, as the air flow path inside the electrical-component cover, a flow path for leading the air taken in through the air inlet to the air outlet after bringing the air into detour around the electrical component. The flow path can bring the air sucked into the electrical-component cover through the air inlet into efficient contact with the outer surfaces of the electrical component to thereby cool the electrical component effectively.

It is preferable: that the construction machine further includes a seal member; that the electrical-component cover is disposed so as to make the air outlet overlap the air intake duct in side view; and that the seal member is interposed between the electrical-component cover and the air intake duct, along a peripheral edge of the air outlet. The seal member prevents heated air generated by heat of the engine from intrusion into the air intake duct through the clearance between the electrical-component cover and the air intake duct, thereby making the cooling of the electrical component by the air be more effective.

The construction machine may further include a placement member disposed above the air intake duct to allow a tool box to be placed on the placement member. In this configuration, the electrical-component cover is preferably disposed so as to make the air inlet overlap the placement table in side view and the placement member is formed with a communication hole having communication with the air inlet. The placement member, located so as to overlap the electrical-component cover in side view, can prevent the operator from inadvertent contact with the electrical component. Meanwhile, the placement member is capable of first receiving an external impact due to roll-over of the construction machine or the like, thereby preventing the impact from direct application to the electrical component. Furthermore, the communication hole formed in the placement member prevents the placement member from closing the air inlet of the electrical-component cover.

It is preferable that the electrical component is provided with a plurality of cooling fins spaced in a width direction of the electrical component, each of the cooling fins extending vertically, and the air inlet is located higher than the air outlet of the electrical-component cover so as to cause air introduced into the inside of the electrical-component cover through the air inlet to flow downward through a clearance between the cooling fins adjacent to each other. The flow of air in the clearance between the cooling fins further enhances the cooling efficiency of the electrical component.

For instance, in the arrangement where: the electrical-component cover includes a side wall portion facing both of a first space in the air intake chamber and a second space in the air intake duct across the first and second spaces; the air inlet and the air outlet are formed in the side wall portion; the construction machine further includes a partition member partitioning the clearance between the inner surface of the side wall portion and the outer surface of the electrical component into a space in communication with the air inlet and a space in communication with the air outlet; and, as the air flow path inside the electrical-component cover, a flow path extending from the air inlet to the air outlet via a space around the electrical component is formed, it is preferable that the cooling fins project beyond a specific surface included in the outer surface of the electrical component, the specific surface facing a side opposite to the side wall portion. This allows the cooling fins to be formed in a large area on the side opposite to the partition member to thereby make the advantageous effect of enhancing the cooling efficiency by the cooling fins be remarkable.

This application is based on Japanese Patent Application No. 2014-015795 filed on Jan. 30, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A construction machine, comprising:
a lower traveling body;
an upper slewing body slewably loaded on the lower traveling body, the upper slewing body including an air intake chamber capable of taking in air;
an engine loaded on the upper slewing body;
an electrical component loaded on the upper slewing body;
an air intake duct forming a duct flow path for guiding the air taken into the air intake chamber toward the engine;
a blow fan to direct the air inside the air intake chamber toward the engine through the duct flow path; and
an electrical-component cover which covers the electrical component so as to define an air flow path, between the electrical-component cover and the electrical component disposed on an inner side of the electrical-component cover, for flowing air along the electrical component, the electrical-component cover including an air inlet which brings an upstream portion of the air flow path into communication with the air intake chamber and an air outlet which brings a downstream portion of the air flow path into communication with the air intake duct.

2. The construction machine according to claim 1, wherein the electrical component is surrounded by a clearance formed between an outer surface of the electrical component and an inner surface of the electrical-component cover, the clearance constituting the air flow path.

3. The construction machine according to claim 2, wherein: the electrical-component cover includes a side wall portion facing both of a first space in the air intake chamber and a second space in the air intake duct across the first and second spaces; the air inlet and the air outlet are formed in the side wall portion; and the construction machine further includes a partition member provided inside the electrical-component cover to partition a clearance between an inner surface of the side wall portion and the outer surface of the electrical component into a space in communication with the air inlet and a space in communication with the air outlet.

4. The construction machine according to claim 1, further comprising a seal member, wherein the electrical-component cover is disposed so as to make the air outlet overlap the air intake duct in side view and the seal member is interposed between the electrical-component cover and the air intake duct, along a peripheral edge of the air outlet.

5. The construction machine according to claim 1, further comprising a placement member disposed above the air intake duct to allow a tool box to be placed on the placement member, wherein the electrical-component cover is disposed so as to make the air inlet overlap the placement member in side view, and the placement member is formed with a communication hole having communicating with the air inlet.

6. The construction machine according to claim 1, wherein the electrical component is provided with a plurality of cooling fins spaced in a width direction of the electrical component, each of the cooling fins extending vertically, and the air inlet is located higher than the air outlet of the electrical-component cover so as to cause air introduced into the inner side of the electrical-component cover through the air inlet to flow downward through a clearance between the cooling fins adjacent to each other.

7. The construction machine according to claim 3, wherein: the electrical component is provided with a plurality of cooling fins spaced in a width direction of the electrical component, each of the cooling fins extending vertically; the cooling fins project beyond a specific surface included in the outer surface of the electrical component, the specific surface facing a side opposite to the side wall portion; and the air inlet is located higher than the air outlet of the electrical-component cover so as to cause air introduced into the inside of the electrical-component cover through the air inlet to flow downward through a clearance between the cooling fins adjacent to each other.

\* \* \* \* \*